US009046656B2

(12) United States Patent
Liu et al.

(10) Patent No.: US 9,046,656 B2
(45) Date of Patent: Jun. 2, 2015

(54) ISOTROPIC LAYER OF MULTILAYER OPTICAL FILM COMPRISING BIREFRINGENT THERMOPLASTIC POLYMER

(75) Inventors: Yufeng Liu, Woodbury, MN (US); Stephen A. Johnson, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 750 days.

(21) Appl. No.: 12/273,006

(22) Filed: Nov. 18, 2008

(65) Prior Publication Data

US 2010/0124667 A1 May 20, 2010

(51) Int. Cl.
B32B 7/02 (2006.01)
B32B 27/36 (2006.01)
B32B 37/15 (2006.01)
(Continued)

(52) U.S. Cl.
CPC ........... *G02B 5/3083* (2013.01); *Y10T 428/261* (2015.01); *G02B 5/0841* (2013.01); *B29D 11/00788* (2013.01); *G02B 5/305* (2013.01); *B29C 47/0057* (2013.01); *G02B 1/04* (2013.01); *C08L 2666/18* (2013.01); *C08L 2205/02* (2013.01); *C08G 63/88* (2013.01); *C08G 63/183* (2013.01); *C08G 63/189* (2013.01); *C08L 67/02* (2013.01); *C08L 2205/025* (2013.01); *C08L 2205/05* (2013.01); *B32B 2250/42* (2013.01); *B32B 2250/244* (2013.01); *B32B 2307/42* (2013.01); *B32B 2307/418* (2013.01); *B32B 2551/00* (2013.01); *B32B 38/00* (2013.01); *B32B 2307/706* (2013.01); *B32B 2307/514* (2013.01); *B32B 37/15* (2013.01); *B32B 2307/40* (2013.01); *B32B 2307/708* (2013.01); *B32B 2307/416* (2013.01); *B32B 2367/00* (2013.01); *B32B 2307/412* (2013.01); *B32B 37/153* (2013.01); *B32B 2551/08* (2013.01); *B32B 2250/05* (2013.01); *B32B 2255/26* (2013.01); *B32B 2255/10* (2013.01); *B32B 2038/0028* (2013.01); *C08K 2003/2296* (2013.01); *B32B 7/02* (2013.01); *B32B 27/36* (2013.01); *G02F 2202/40* (2013.01)

(58) Field of Classification Search
None
See application file for complete search history.

(56) References Cited

U.S. PATENT DOCUMENTS 3,546,320 A * 12/1970 Stearns et al. ................ 525/444
4,313,903 A    2/1982 Bier
(Continued)

FOREIGN PATENT DOCUMENTS

CN    101295047    10/2008
EP    0735952    10/1996
(Continued)

OTHER PUBLICATIONS (PCT/US2009/063036) International Search Report.
(Continued)

*Primary Examiner* — Vivian Chen
(74) *Attorney, Agent, or Firm* — Carolyn A. Fischer

(57) ABSTRACT

Multilayer optical films are described comprising at least one first optical layer comprising a birefringent thermoplastic polymer having an in-plane birefringence of at least 0.15 at 632.8 nm; and at least one second optical layer having an in-plane birefringence of less than 0.040 at 632.8 nm. The second optical layer comprises a copolymerized blend of at least one birefringent thermoplastic polymer and at least one second thermoplastic polymer.

18 Claims, 3 Drawing Sheets

(51) Int. Cl.
*B32B 38/00* (2006.01)
*C08K 3/22* (2006.01)
*C08G 63/183* (2006.01)
*C08G 63/189* (2006.01)
*C08G 63/88* (2006.01)
*C08L 67/02* (2006.01)
*G02B 5/08* (2006.01)
*G02B 5/30* (2006.01)
*G02B 1/04* (2006.01)
*B29D 11/00* (2006.01)
*B29C 47/00* (2006.01)

(56) References Cited

U.S. PATENT DOCUMENTS

| | | | |
|---|---|---|---|
| 4,489,110 A | 12/1984 | Bier | |
| 4,535,124 A | 8/1985 | Binsack | |
| 5,039,760 A | 8/1991 | Nakane et al. | |
| 5,175,030 A | 12/1992 | Lu et al. | |
| 5,183,597 A | 2/1993 | Lu | |
| 5,677,050 A | 10/1997 | Bilkadi et al. | |
| 5,688,874 A * | 11/1997 | Hoffman | 525/444 |
| 5,882,774 A * | 3/1999 | Jonza et al. | 428/212 |
| 6,096,375 A | 8/2000 | Ouderkirk et al. | |
| 6,111,697 A * | 8/2000 | Merrill et al. | 359/487.02 |
| 6,179,948 B1 * | 1/2001 | Merrill et al. | 156/229 |
| 6,207,260 B1 * | 3/2001 | Wheatley et al. | 428/212 |
| 6,268,961 B1 * | 7/2001 | Nevitt et al. | 359/485.03 |
| 6,307,676 B1 * | 10/2001 | Merrill et al. | 359/487.02 |
| 6,352,761 B1 * | 3/2002 | Hebrink et al. | 428/212 |
| 6,368,699 B1 * | 4/2002 | Gilbert et al. | 428/212 |
| 6,449,093 B2 * | 9/2002 | Hebrink et al. | 359/489.15 |
| 6,459,514 B2 | 10/2002 | Gilbert et al. | |
| 6,498,683 B2 * | 12/2002 | Condo et al. | 359/589 |
| 6,569,515 B2 * | 5/2003 | Hebrink et al. | 428/212 |
| 6,583,930 B1 | 6/2003 | Schrenk | |
| 6,609,795 B2 * | 8/2003 | Weber et al. | 353/20 |
| 6,627,300 B1 * | 9/2003 | Kent et al. | 428/212 |
| 6,641,900 B2 | 11/2003 | Hebrink et al. | |
| 6,673,275 B1 * | 1/2004 | Allen et al. | 264/1.1 |
| 6,783,349 B2 | 8/2004 | Neavin et al. | |
| 6,827,886 B2 * | 12/2004 | Neavin et al. | 264/1.6 |
| 6,888,677 B2 * | 5/2005 | Condo et al. | 359/360 |
| 6,953,623 B2 * | 10/2005 | Olson et al. | 428/412 |
| 7,074,463 B2 | 7/2006 | Jones et al. | |
| 7,771,801 B2 | 8/2010 | Farrand | |
| 7,911,557 B2 | 3/2011 | Lazarev | |
| 2002/0005986 A1 * | 1/2002 | Hebrink et al. | 359/497 |
| 2002/0064671 A1 | 5/2002 | Hebrink et al. | |
| 2006/0004166 A1 | 1/2006 | Olson et al. | |
| 2006/0033865 A1 | 2/2006 | Tanaka | |
| 2006/0084780 A1 * | 4/2006 | Hebrink et al. | 528/272 |
| 2006/0204679 A1 * | 9/2006 | Jones et al. | 428/1.3 |
| 2006/0226561 A1 * | 10/2006 | Merrill et al. | 264/1.34 |
| 2006/0226562 A1 * | 10/2006 | Johnson et al. | 264/1.34 |
| 2007/0195412 A1 | 8/2007 | Oya et al. | |
| 2007/0298271 A1 | 12/2007 | Liu et al. | |
| 2008/0057277 A1 | 3/2008 | Bluem | |
| 2008/0197518 A1 | 8/2008 | Aylward | |
| 2010/0033826 A1 * | 2/2010 | Kolb et al. | 359/599 |

FOREIGN PATENT DOCUMENTS

| | | |
|---|---|---|
| JP | 2004-117652 | 4/2004 |
| JP | 2006-178419 | 7/2006 |
| JP | 2008-530585 | 8/2008 |
| JP | 2008-268861 | 11/2008 |
| JP | 2010-503022 | 1/2010 |
| WO | WO 95/17303 | 6/1995 |
| WO | WO 99/36262 | 7/1999 |
| WO | WO 99/36812 | 7/1999 |
| WO | WO 02/31541 | 4/2002 |
| WO | WO 02/051892 | 7/2002 |
| WO | WO 02/101427 | 12/2002 |
| WO | WO 2006/044075 | 4/2006 |
| WO | WO 2007/115041 | 10/2007 |
| WO | WO 2007/149955 | 12/2007 |
| WO | WO 2008/121465 | 10/2008 |

OTHER PUBLICATIONS

U.S. Appl. No. 09/006,288, filed Jan. 13, 1998.

* cited by examiner

ISOTROPIC LAYER OF MULTILAYER OPTICAL FILM COMPRISING BIREFRINGENT THERMOPLASTIC POLYMER

BACKGROUND

Multilayered polymer films comprising one or more first birefringent optical layers alternated with one or more second layers are known.

As described for example in Hebrink et al. U.S. Pat. No. 6,641,900, polyethylene naphthalate (PEN) is an example of a useful material for forming the first optical layer because it is highly birefringent after stretching. Examples of suitable materials for the second optical layers are copolymers of PEN, PBN, PET, or PBT. One example of a polyester for use in second optical layers is coPEN having carboxylate subunits which are about 70 mol % naphthalate and about 30 mol % isophthalate or terephthalate subunits. Another example is a coPEN wherein 20 to 60 mol % of the carboxylate subunits are naphthalate, 20 to 50 mol % are terephthalate, and 0 to 10 mol % are isophthalate subunits.

Other polymeric materials have been described for use in multilayered optical films. For example, Allen et al., U.S. Pat. No. 6,673,275 describes an optical film wherein at least one of the continuous and disperse phases comprises a blend of homopolymers that are inter-reacted, as by transesterification. The resulting films can exhibit a higher degree of birefringence for a given level of strain than analogous films in which the blend is replace by a random copolymer.

SUMMARY

Although U.S. Pat. No. 6,673,275 describes copolymerized blends of PEN and PET that exhibit a high degree of birefringence, it has been found that these same and other copolymerized blends comprising birefringent polymers are suitable for use as the isotropic layer of a multilayered optical film.

Copolymerized blends comprising birefringent polymers can be rendered isotropic when the multilayer optical film is orientated at a temperature sufficiently above the Tg of the copolymerized blend of the second optical layer. Since the first and second optical layers are concurrently oriented, the composition of the thermoplastic polymer of the first optical layer is selected such that the thermoplastic polymer has a glass transition temperature (Tg) sufficiently above the glass transition temperature of the thermoplastic polymer of the second optical layer, and upon orientation temperature has an in-plane birefringence of at least 0.15 at 632.8 nm.

Presently described are multilayer optical films comprising at least one first optical layer comprising a birefringent thermoplastic polymer having an in-plane birefringence of at least 0.15 at 632.8 nm; and at least one second optical layer having an in-plane birefringence of less than 0.040 at 632.8 nm.

In one embodiment, the second optical layer comprises a copolymerized blend of 20 to 80 mol % of at least one birefringent thermoplastic polymer and at least one second thermoplastic polymer.

In other embodiments, the first optical layer comprises a birefringent thermoplastic polymer comprising at least 70 mol % naphthalate subunits, based on 100% carboxylate subunits; and the second optical layer comprises a copolymerized blend of a birefringent thermoplastic polymer comprising at least 20 mol % naphthalate subunits, based on 100% carboxylate subunits and at least one other thermoplastic polymer. In another embodiment, the copolymerized blend has a Tg at least 10° C. less than the birefringent thermoplastic polymer of the first optical layer. In another embodiment, the multilayer film comprises blocks of polyethylene naphthalate having an average block length of at least 6 repeat units. In yet another embodiment, the multilayer film exhibits an interlayer of adhesion of at least 1000 g/inch according to the 90° Peel Test.

In each of these embodiments, the birefringent thermoplastic polymer of the first optical layer has a Tg greater than the copolymerized blend of the second layer. The birefringent thermoplastic polymer of the first optical layer and the birefringent polymer of the copolymerized blend of the second optical layer preferably comprise at least 90 mol % of the same carboxylate and glycol subunits. The second thermoplastic polymer of the second layer typically has a Tg less than the birefringent thermoplastic polymer of the second optical layer.

In each of these embodiments, the birefringent thermoplastic polymer of the first and second optical layer preferably comprises PEN, coPEN, PBN, coPBN. The birefringent coPEN comprises at least 70 mol % naphthalate subunits, based on a 100 mol % carboxylate subunits. The second thermoplastic polymer of the second optical layer may comprise PET, PETg, coPET, PBT, and coPBT. The coPET may comprise at least 50 mol % terephthalate subunits, based on 100 mol % carboxylate subunits.

In each of these embodiments, the copolymerized blend of the second optical layer preferably has a % randomness of less than 50%, and more preferably of less than 25%. The copolymerized blend of the second layer preferably comprises A-B multi-block copolymer structures wherein the A blocks comprise the birefringent thermoplastic polymer and the B blocks comprise the second thermoplastic polymer. The A-B multi-block copolymer structures of the second layer have an average block length of at least 6 and typically no greater than 25. In some embodiments, the second optical layer comprises 30 to 70 mol % or 40 to 60 mol % of one or more birefringent thermoplastic polymers.

The multilayered optical film is suitable for various uses such as a reflective polarizing film or a mirror film. In one embodiment, the multilayered optical film described herein is a (preformed) base layer of an optical film further comprising a microstructured surface layer disposed on the base layer.

DETAILED DESCRIPTION

Figure 1:
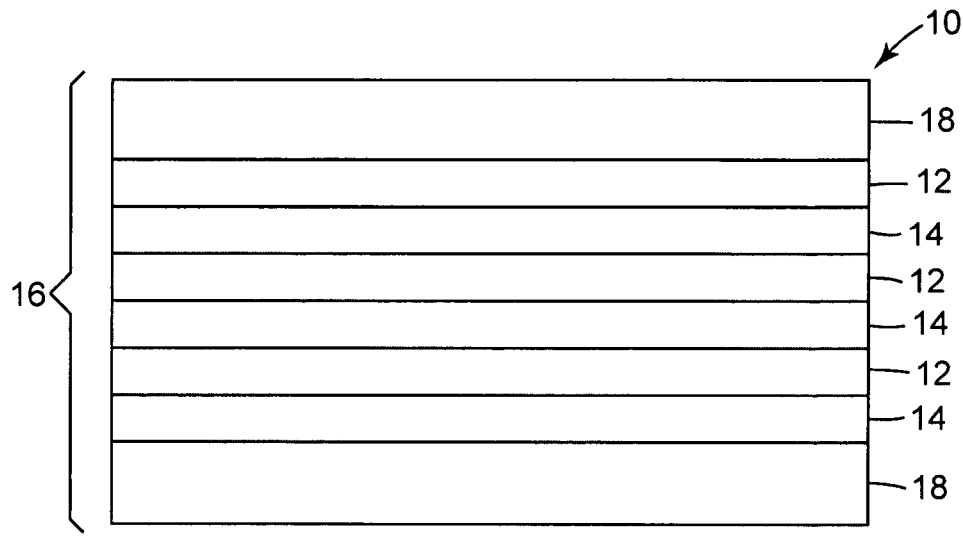
FIG. 1 is a cross sectional view of one embodiment of a multilayer optical film.

Multilayer film embodiments include a film having two or more layers. Multilayer optical films are useful, for example, as highly efficient mirrors and/or polarizers. Multilayer optical films as used in conjunction with the present disclosure exhibit relatively low absorption of incident light, as well as high reflectivity for off-axis as well as normal light rays.

As used in this application:

"index of refraction" refers to a refractive index of a material in the plane of the material with respect to light at 633 nm and normal incidence, unless otherwise indicated;

"birefringent" means that the indices of refraction in orthogonal x, y, and z directions are not all the same. Index of refraction is designated as $n_x$, $n_y$, and $n_z$ for x, y, and z directions, respectively. For the polymer layers described herein, the axes are selected so that x and y axes are in the plane of the layer and the z axis is normal to the plane of the layer and typically corresponds to the thickness or height of the layer. Where a refractive index in one in-plane direction is larger than a refractive index in another in-plane direction, the x-axis is generally chosen to be the in-plane direction with the largest index of refraction, which sometimes corresponds to one of the directions in which the optical film is oriented (e.g., stretched). In-plane and out-of-plane birefringence values reported herein were calculated according to the test methods section described later with respect to light at 633 nm and normal incidence, unless otherwise indicated;

"high refractive index" and "low refractive index" are relative terms; when two layers are compared in both in-plane directions of interest, the layer that has a greater average in-plane refractive index is the high refractive index layer, and the layer that has a lower average in-plane refractive index is the low refractive index layer;

"polymer" with respect to the first birefringent layer means, unless otherwise indicated, polymers and copolymers (i.e., polymers formed from two or more monomers or comonomers, including terpolymers, for example), as well as copolymers or polymers that can be formed in a miscible blend by, for example, coextrusion or reaction, including transesterification, for example. Block, random, graft, and alternating polymers are included, unless indicated otherwise;

"constrained uniaxial stretching" refers to a film stretching process in which external stress is applied to introduce dimensional change in primarily two directions, in-plane stretching direction (i.e. x) and normal to in-plane (i.e. y). Specifically, it refers to a dimensional elongation in the in-plane stretching direction while substantially maintaining the film width in the in-plane non-stretching direction. As a result, the film thickness reduction usually scales with the film draw ratio and the structure is largely planar.

"Tg" refers to glass transition temperature as determined Differential Scanning Calorimetry DSC (Q2000 commercially available from TA Instruments, New Castle, Del.). A sample of about 5-10 mg can be used for each composition. The test involves a 3 stage heating-cooling-heating temperature ramp at a temperature range of 30-290° C. The sample is held at 290° C. for 3 min after the first heat. The ramp rate was 20° C./min for both heating and cooling. Tg refers to the Tg evident from the first heating scan.

FIG. 1 shows a multilayer polymer film 10 that may be used, for example, as an optical polarizer or mirror. The film 10 includes one or more first optical layers 12, one or more second optical layers 14, and optionally one or more (e.g. non-optical) additional layers 18. FIG. 1 includes a multilayer stack having alternating layers 12, 14 of at least two materials. In one embodiment, the materials of layers 12 and 14 are polymeric. In general, a layer-by-layer forced assembly process can be adopted to make the multilayer film 10. U.S. Pat. No. 6,827,886, entitled "Method for making multilayer optical films," hereby incorporated by reference, describes methods that also can be adapted for making multilayer film 10. In addition, although film 10 and layers 12, 14 are illustrated as having planar surfaces, at least one surface of the film 10 or layers 12, 14 or an additional layer may be structured.

An in-plane index of refraction $n_1$ in one in-plane direction of high refractive index layer 12 is higher than the in-plane index of refraction $n_2$ of low refractive index layer 14 in the same in-plane direction. The difference in refractive index at each boundary between layers 12, 14 causes part of light ray to be reflected. The transmission and reflection characteristics of multilayer film 10 is based on coherent interference of light caused by the refractive index difference between layers 12, 14 and the thicknesses of layers 12, 14. When the effective indices of refraction (or in-plane indices of refraction for normal incidence) differ between layers 12, 14, the interface between adjacent layers 12, 14 forms a reflecting surface. The reflective power of interface surface depends on the square of the difference between the effective indices of refraction of the layers 12, 14 (e.g., $(n_1-n_2)^2$). By increasing the difference in the indices of refraction between the layers 12, 14, improved optical power (higher reflectivity), thinner films (thinner or fewer layers), and broader bandwidth performance can be achieved. Multilayer film 10 can thus be made useful as a reflective polarizer or mirror, for example. The refractive index difference in one in-plane direction in an exemplary embodiment is at least about 0.05, preferably greater than about 0.10, more preferably greater than about 0.15 and even more preferably greater than about 0.20.

In one embodiment, the materials of layers 12, 14 inherently have differing indices of refraction. In another embodiment, at least one of the materials of the layers 12, 14 has the property of stress induced birefringence, such that the index of refraction (n) of the material is affected by the stretching process. By stretching multilayer film 10 over a range of uniaxial to biaxial orientations, films can be created with a range of reflectivities for differently oriented plane-polarized incident light.

In exemplary embodiments, multilayer film 10 includes tens, hundreds or thousands of layers, and each layer can be made from any of a number of different materials. The characteristics which determine the choice of materials for a particular stack depend upon the desired optical performance of multilayer film 10. Multilayer film 10 can contain as many materials as there are layers in the stack. However, for ease of illustration, exemplary embodiments of optical thin film stacks show only a few different materials.

In one embodiment, the number of layers in multilayer film 10 is selected to achieve the desired optical properties using the minimum number of layers for reasons of film thickness, flexibility and economy. In the case of reflective films such as polarizers and mirrors, the number of layers is preferably less than about 2,000, more preferably less than about 1,000, and even more preferably less than about 500.

In some embodiments, the multilayer polymer film further comprises optional additional non-optical or optical layers. The additional layers 18 are polymer layers that are disposed within the stack 16. Such additional layers may protect the optical layers 12, 14 from damage, aid in the co-extrusion processing, and/or to enhance post-processing mechanical properties. The additional layers 18 are often thicker than the optical layers 12, 14. The thickness of the additional (e.g. skin) layers 18 is usually at least two times, preferably at least four times, and more preferably at least ten times, the thickness of the individual optical layers 12, 14. The thickness of the additional layers 18 may be varied to make a multilayer polymer film 10 having a particular thickness. Typically, one or more of the additional layers 18 are placed so that at least a portion of the light to be transmitted, polarized, and/or reflected by the optical layers 12, 14, also travels through the additional layers (i.e., the additional layers are placed in the path of light which travels through or is reflected by the optical layers 12, 14).

One embodiment of multilayer film 10 comprises multiple low/high index pairs of film layers, wherein each low/high index pair of layers has a combined optical thickness of ½ the center wavelength of the band it is designed to reflect. Stacks of such films are commonly referred to as quarterwave stacks. For multilayer optical films concerned with the visible and the near infrared wavelengths, a quarterwave stack design results in each of the layers 12, 14 in the multilayer stack having an average thickness of not more than about 0.5 micrometers. In other exemplary embodiments, different low-high index pairs of layers may have different combined optical thicknesses, such as where a broadband reflective optical film is desired.

In those applications where reflective films (e.g. mirrors or polarizers) are desired, the desired average transmission for light of each polarization and plane of incidence generally depends upon the intended use of the reflective film. One way to produce a multilayer mirror film is to biaxially stretch a multilayer stack. For a high efficiency reflective film, average transmission along each stretch direction at normal incidence over the visible spectrum (about 380-750 nm) is desirably less than about 10 percent (reflectance greater than about 90 percent), preferably less than about 5 percent (reflectance greater than about 95 percent), more preferably less than about 2 percent (reflectance greater than about 98 percent), and even more preferably less than about 1 percent (reflectance greater than about 99 percent). The average transmission at about 60 degrees from the normal over the visible spectrum is desirably less than about 20 percent (reflectance greater than about 80 percent), preferably less than about 10 percent (reflectance greater than about 90 percent), more preferably less than about 5 percent (reflectance greater than about 95 percent), and even more preferably less than about 2 percent (reflectance greater than about 98 percent), and even more preferably less than about 1 percent (reflectance greater than about 99 percent). Some examples of mirror films are further described in U.S. Pat. No. 5,882,774 (Jonza et al.).

In addition, asymmetric reflective films (such as films resulting from unbalanced biaxial stretching) may be desirable for certain applications. In that case, average transmission along one stretch direction may be desirably less than, for example, about 50 percent, while the average transmission along the other stretch direction may be desirably less than, for example, about 20 percent, over a bandwidth of, for example, the visible spectrum (about 380-750 nm), or over the visible spectrum and into the near infrared (e.g., about 380-850 nm).

Multilayer optical films can also be designed to operate as reflective polarizers. One way to produce a multilayer reflective polarizer is to uniaxially stretch a multilayer stack. The resulting reflective polarizers have high reflectivity for light with its plane of polarization parallel to a first in-plane axis (usually, in the stretch direction) for a broad range of angles of incidence, and simultaneously have low reflectivity and high transmissivity for light with its plane of polarization parallel to a second in-plane axis that is orthogonal to the first in-plane axis (usually, in the non-stretch direction) for a broad range of angles of incidence. By controlling the three indices of refraction of each film, nx, ny and nz, the desired polarizer behavior can be obtained. See, for example, U.S. Pat. No. 5,882,774 (Jonza et al.).

The optical layers 12, 14 and the optional additional layers 18 of the multilayer polymer film 10 are typically composed of polymers such as polyesters. Polyesters include carboxylate and glycol subunits and are generated by reactions of carboxylate monomer molecules with glycol monomer molecules. Each carboxylate monomer molecule has two or more carboxylic acid or ester functional groups and each glycol monomer molecule has two or more hydroxy functional groups. The carboxylate monomer molecules may all be the same or there may be two or more different types of molecules. The same applies to the glycol monomer molecules. The properties of a polymer layer or film vary with the particular choice of monomer molecules of the polyester.

As previously discussed in-plane birefringence properties are important for many types of multilayer optical films such as multilayer optical films utilized as a polarizer. The first optical layer(s) are prepared from a birefringent polymer having an in-plane birefringence (the absolute value of $n_x-n_y$) after orientation is at least 0.10 and preferably at least 0.15. In some embodiments the birefringent polymer of the first optical layer is 0.20 or greater. The refractive index of the polyester for 632.8 nm light polarized in a plane parallel to the stretch direction can increase from about 1.62 to as high as about 1.87. For other types of multilayer optical films, such as those utilized as a mirror film, the out-of-plane birefringence properties are of importance. In some embodiments, the average out-of-plane birefringence of at least 0.10, at least 0.15 or at least 0.20.

Preferably, the second optical layers have both out-of-plane and in-plane birefringence of less than about 0.04, and more preferably less than about 0.02 at 632.8 nm after orientation.

The first birefringent optical layer(s) of the multilayer optical film is typically prepared from a polyester homopolymer such as polyethylene naphthalate (PEN) or polybutylene naphthalate, or a birefringent random copolymer copolyester. Alternatively, the first birefringent optical layer may comprise a highly birefringent copolymerized (i.e. by transesterfication) blend of polyester homopolymers such as described in U.S. Pat. No. 6,673,275, a copolymerized blend of copolyesters, or at least one homopolymer copolymerized with at least one other copolyester.

Polyester homopolymers and copolyester polymeric materials can be described with reference to the overall composition i.e. 100 mol % units derived from 50 mol % carboxylate units and 50 mol % glycol units. Copolyester polymeric materials may also be described with reference to the mol % of carboxylate subunits and mol % glycol subunits (i.e. 100 mol % of carboxylate subunits are reacted with 100 mol % of glycol subunits in the preparation of the copolyester).

The following Table 1 depicts the carboxylate and glycol subunits for various exemplary birefringent polymers that can be used independently or in combination with each other as the first birefringent optical layer of the multilayer optical film.

TABLE 1

Birefringent Polyesters and Copolyesters

| Polymer Description | Carboxylate Subunits Acid/Ester Monomers | | | Glycol Subunits Alcohol Monomers | | |
|---|---|---|---|---|---|---|
| | Mol % NDA | Mol % TA | Mol % Other | Mol % EG | Mol % BD | Mol % Other |
| PEN | >95% | 0 or up to 5% | 0 or up to 5% | >95% | 0 or up to 5% | 0 or up to 5% |
| CoPEN | >70% | <30% | <30% | >90% | <10% | <10% |

TABLE 1-continued

Birefringent Polyesters and Copolyesters

| Polymer Description | Carboxylate Subunits Acid/Ester Monomers | | | Glycol Subunits Alcohol Monomers | | |
|---|---|---|---|---|---|---|
| | Mol % NDA | Mol % TA | Mol % Other | Mol % EG | Mol % BD | Mol % Other |
| PBN | >95% | 0 or up to 5% | 0 or up to 5% | 0 or up to 5% | >95% | 0 or up to 5% |
| CoPBN | >70% | <30% | <30% | 0 or up to 10% | >90% | 0 or up to 10% |

PEN—poly(ethylene 2,6-naphthalate)
CoPEN—copolyesters comprising ethylene glycol and naphthalate subunits
PBN—poly(1,4-butylene 2,6-naphthalate)
CoPBN—copolyesters comprising butane diol and naphthalate subunits
TA—terephthalic acid
NDA—2,6-Naphthalene Dicarboxylic Acid
EG—Ethylene Glycol
BD—1,4-Butanediol The exemplary birefringent polyester homopolymers share the common feature that at least 95 mol % of the carboxylate subunits is NDA (PEN or PBN). Further, the exemplary birefringent polyesters share the common feature that at least 95 mol % of the glycol subunits are EG (PEN) or BD (PBN). The exemplary birefringent copolyesters share the common feature that at least 70 mol %, 75 mol %, 80 mol %, 85 mol %, 90 mol % up to but no including 95 mol % of the carboxylate subunits are NDA (CoPEN and CoPBN).

In one preferred embodiment, the first birefringent optical layer comprises or consists essentially of PEN. In another preferred embodiment, the first birefringent optical layer comprises or consists of a random CoPEN comprising at least 70 mol % NDA subunits. In another preferred embodiment, the first birefringent optical layer comprises or consists of a copolymerized blend of PEN and PET in which PEN is more than 70 mol %.

Figure 2:
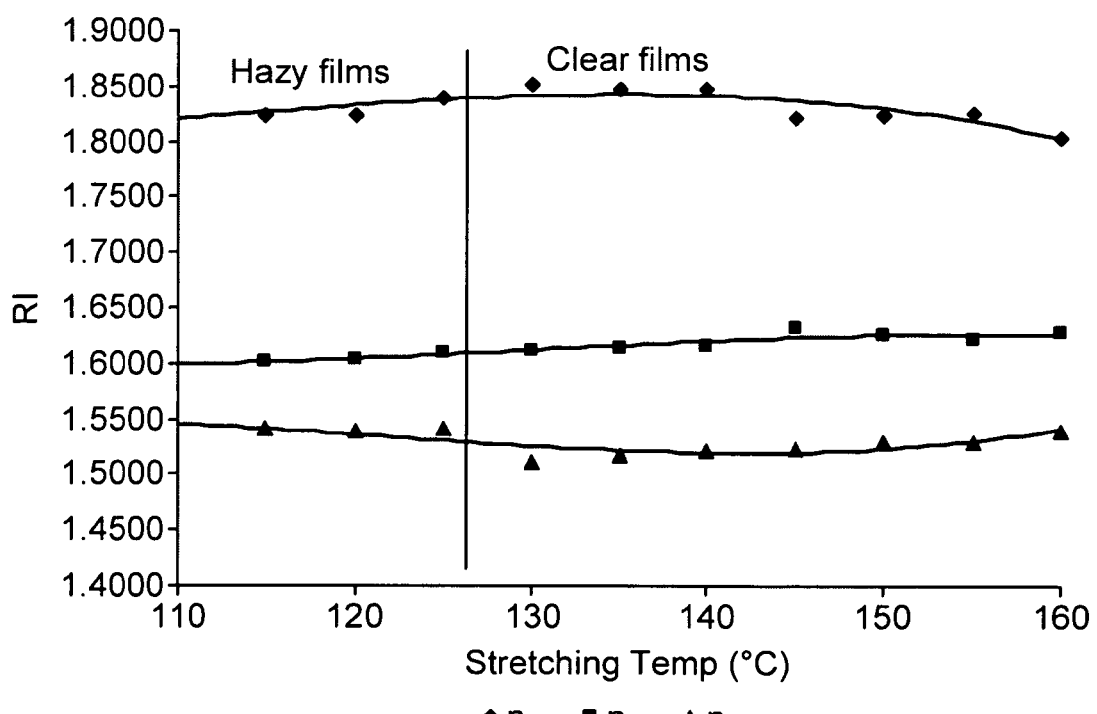
FIG. 2 is a graph illustrating $n_x$, $n_y$, and $n_z$ of PEN versus stretching temperature.

With reference to FIG. 2, the first optical layers (e.g. comprised of PEN homopolymer) exhibit a high birefringence throughout a relatively large orientation temperature window. The $n_x$ and $n_y$ are nearly parallel from 110° C. up to 140° C. and the nx starts to decrease gradually at temperatures of 140° C. to 160° C. Similar birefringence properties can be obtained with various birefringent polyester and copolyesters of Table 1. However, as the concentration of naphthalate subunits decreases, the orientation temperature window decreases as well.

The second optical layers 14 described herein comprise a copolymerized (i.e. by transesterfication) blend of at least one birefringent thermoplastic polymer and at least one second thermoplastic polymer. The second thermoplastic polymer is an additional birefringent or isotropic thermoplastic polymer that is different than the at least one birefringent thermoplastic polymer. "Birefringent" with respect to the polymer(s) of the second optical layer refers to a polymer having an in-plane birefringence of at least 0.10 at 632.8 nm when stretched at a temperature up to 15° C. above the Tg of the polymer. For embodiments wherein the second thermoplastic polymer is also birefringent, the polymer components of the blend are selected such that the copolymerized blend has a Tg at least 10-15° C. less than the birefringent polymer of the first optical layer, as will subsequently be described in greater detail.

The second thermoplastic polymer is typically different in view of comprising different carboxylate and/or different glycol subunits. Alternatively, the second thermoplastic polymer may contain the same carboxylate and glycol subunits but at different mole percentages. Finally, the second thermoplastic polymer could be different because it has a different structural arrangement. For example, the polymer could be a block copolymer formed from copolymerization rather than a random copolymer.

The copolymerized blend of the second optical layer forms a miscible blend. A miscible blend is a blend having a haze of less than 5% per 1 mil thickness according to ASTM D1003-00 using a BYK Haze-Gard Plus.

Table 1, just described, depicts the carboxylate and glycol subunits of various exemplary birefringent polymers that can be used independently or in combination with each other as the birefringent thermoplastic polymer of the copolymerized blend of the second optical layer. In some embodiments, the birefringent polymer of the copolymerized blend of the second optical layer is a different birefringent polymer than the thermoplastic polymer of the first birefringent layer. However, in preferred embodiments, the birefringent polymer component of the copolymerizable blend of the second optical layer is substantially the same (i.e. the kind and amount of carboxylate and glycol subunits differ by no more than 10%, 5% or 2%) relative to the birefringent thermoplastic polymer of the first birefringent layer.

The total amount of birefringent polymer(s) (such as those described in Table 1) of the copolymerizable blend of the second layer is typically at least 20 mol % and not more than 80 mol %. In some embodiments, the total amount of birefringent polymer(s) (such as those described in Table 1) of the copolymerized blend of the second layer ranges from 30 mol %, 31 mol %, 32 mol %, 33 mol %, 34 mol %, 35 mol %, 36 mol %, 37 mol %, 38 mol %, or 39 mol % or 40 mol % up to about 60 mol %, 61 mol %, 62 mol %, 63 mol %, 64 mol %, 65 mol %, 66 mol %, 67 mol %, 68 mol %, or 69 mol %.

The remainder of the copolymerizable blend of the second layer comprises at least one thermoplastic polymer(s) that is different than the birefringent polymer (e.g. of Table 1). Hence, the total about of second thermoplastic polymer(s) of the copolymerizable blend is equal to (100 mol %–mol % of birefringent polymer(s)).

The following Table 2 depicts the carboxylate and glycol subunits for various exemplary polyester and copolyesters polymers that can be used independently or in combination with each other as the second thermoplastic polymer of the copolymerizable blend of the second optical layer.

TABLE 2

Second Polyester(s) or Copolyester(s) in Isotropic Copolymerized Blend

| Polymer Description | Carboxylate Subunits Acid/ Ester Monomers | | Glycol Subunits Alcohol Monomers | | |
|---|---|---|---|---|---|
| | Mol % TA | Mol % Other | Mol % EG | Mol % BD | Mol % Other |
| PET | >95% | 0 or <5% | >95% | <5% | 0 or <5% |
| PETg | >95% | 0 or <5% | <95% | <95% | >5% |
| CoPET | >50% | >5% | <95% | <95% | >5% |
| PBT | >95% | 0 or <5% | <5% | >95% | 0 or <5% |
| CoPBT | >50% | >5% | <95% | <95% | 0 or >5% |

PET—poly(ethylene terephthalate)
PETg—glycol modified PET
CoPET—copolyesters comprising ethylene glycol and terephthalic acid subunits
PBT—poly(butylene terephthalate)
CoPBT—copolyesters comprising butane diol and terephthalic acid subunits
TA—Terephthalic Acid
EG—Ethylene Glycol
BD—1,4-Butanediol The exemplary second polyesters of the copolymerizable blend of the second optical layer share the common feature that at least 95 mol % of the carboxylate subunits are TA (PET, PETg, or PBT). Further, the exemplary birefringent polyesters share the common feature of at least 95 mol % of the glycol subunits are EG or BD moieties (PET or PBT). In some embodiments, at least 95 mol % of the glycol subunits is EG (PET).

The exemplary second copolyesters of the copolymerized blend of the second layer share the common feature of at least 50 mol % up to but not including 95 mol % of the carboxylate subunits are TA (CoPET or CoPBT). In some embodiments, the amount of TA carboxylate units is at least 60, 70, 80, or 90 mol %.

In one preferred embodiment, the second optical layer comprises or consists essentially of copolymerized blends of PEN and PET. In another preferred embodiment, the second optical layer comprises or consists essentially of copolymerized blends of PEN and PETg.

When PEN or coPEN is employed as the first birefringent optical layer in combination with the preferred copolymerized blends just described for the second optical layers, the combination of first and second optical layers (i.e. the optical stack) may comprise greater than 50 mol % of naphthalate units based on 100 mol % carboxylate units. In some embodiments, the optical stack comprises at least 55 mol %, 60 mol %, 65 mol %, 70 mol %, or 75 mol % naphthalate units based on 100 mol % carboxylate units.

Many of the polymer components of the preferred copolymerizable blends of the second optical layer have been described for use as the birefringent first optical layer of a multilayer optical film. However, when these copolymerized blends are used in combination with a birefringent thermoplastic polymer having a sufficiently higher Tg than the copolymerizable blend, the multilayer film can be stretched at least 35° C. above the Tg of the copolymerized blend of the second optical layer, yet only up to 30° C. above the Tg of the first optical layer. One preferred approach to providing such Tg differential is by employing a thermoplastic polymer having a higher concentration of naphthalate subunits than the copolymerized blend to form the first optical layer. The difference in concentration of naphthalate subunits between the birefringent polymer of the first optical layer and the copolymerized blend of the second optical layer is typically at least 10%, 20% or 30% naphthalate subunits. In preferred embodiments, the difference in concentration of naphthalate subunits between the birefringent polymer of the first optical layer and copolymerized blend of the second optical layer is at least 40%, 50% or 60% naphthalate subunits.

Figure 3:
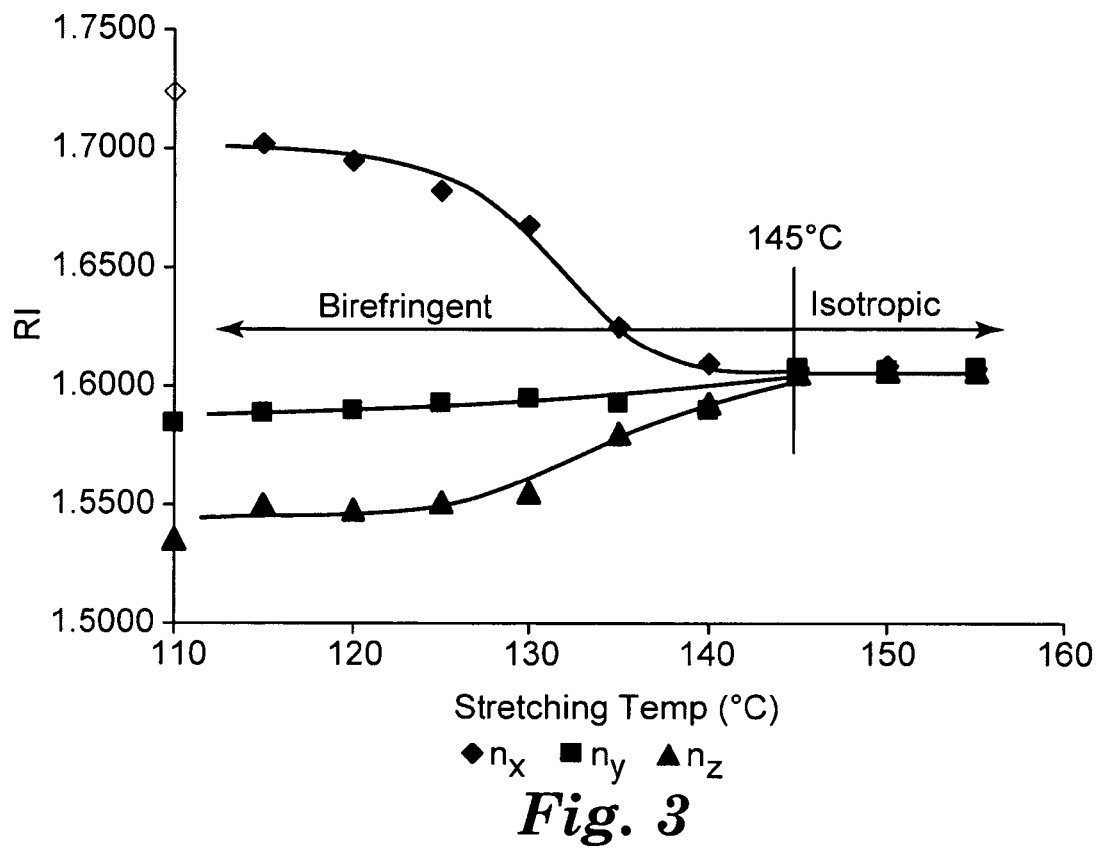
FIG. 3 is a graph illustrating $n_x$, $n_y$, and $n_z$ of a 50/50 PEN/PET copolymerized blend versus stretching temperature.
Figure 4:
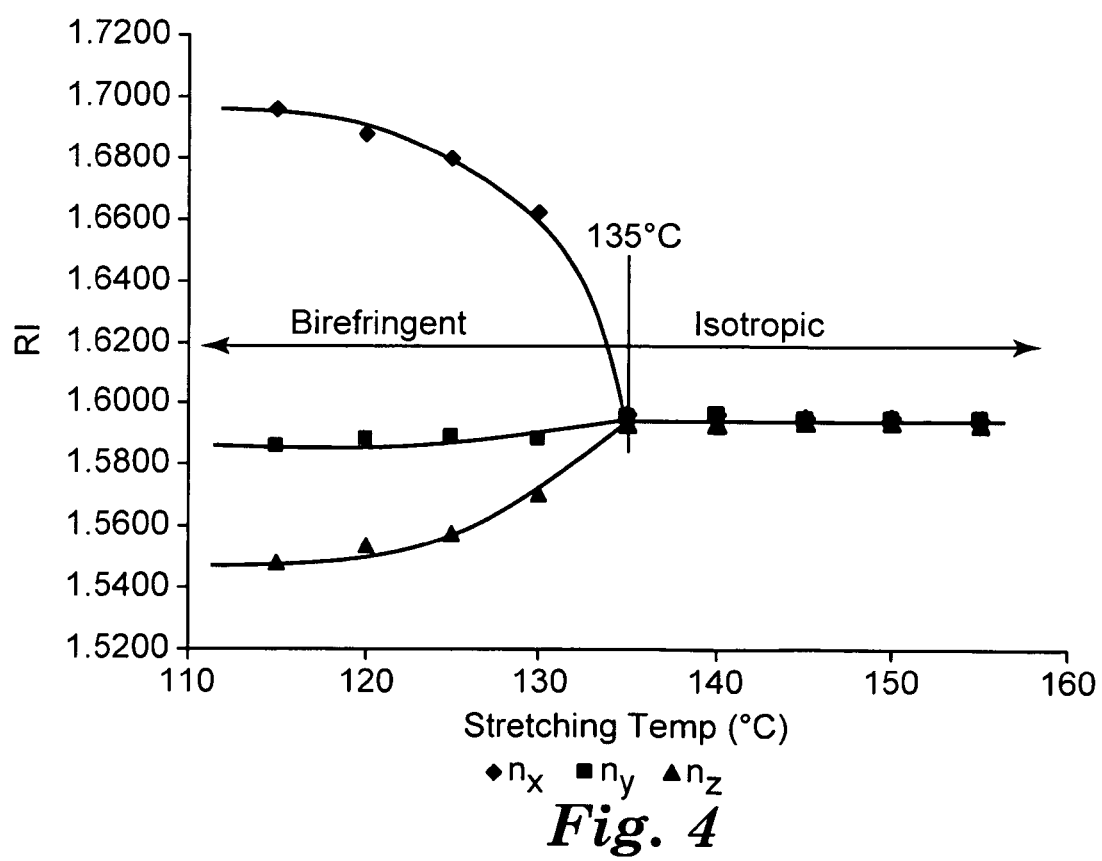
FIG. 4 is a graph illustrating $n_x$, $n_y$, and $n_z$ of a 30/70 PEN/PET copolymerized blend versus stretching temperature.

With reference to FIGS. 3-4, the copolymerized blend of the second optical layers 14 is stretched at a temperature wherein the refractive index components (i.e. $n_x$, $n_y$, and $n_z$) of the blend converge and remain stable at a refractive index of no greater than about 1.64. This stretching temperature is at least about 35° C. above the glass transition temperature (Tg) of the copolymerized blend. With reference to FIG. 2, the thermoplastic polymer (e.g. PEN homopolymer) of the first optical layer is selected such that it has a Tg sufficiently higher than the isotropic second layer and after stretching has in-plane birefringence of at least 0.15 at 632.8 nm.

Figure 5:
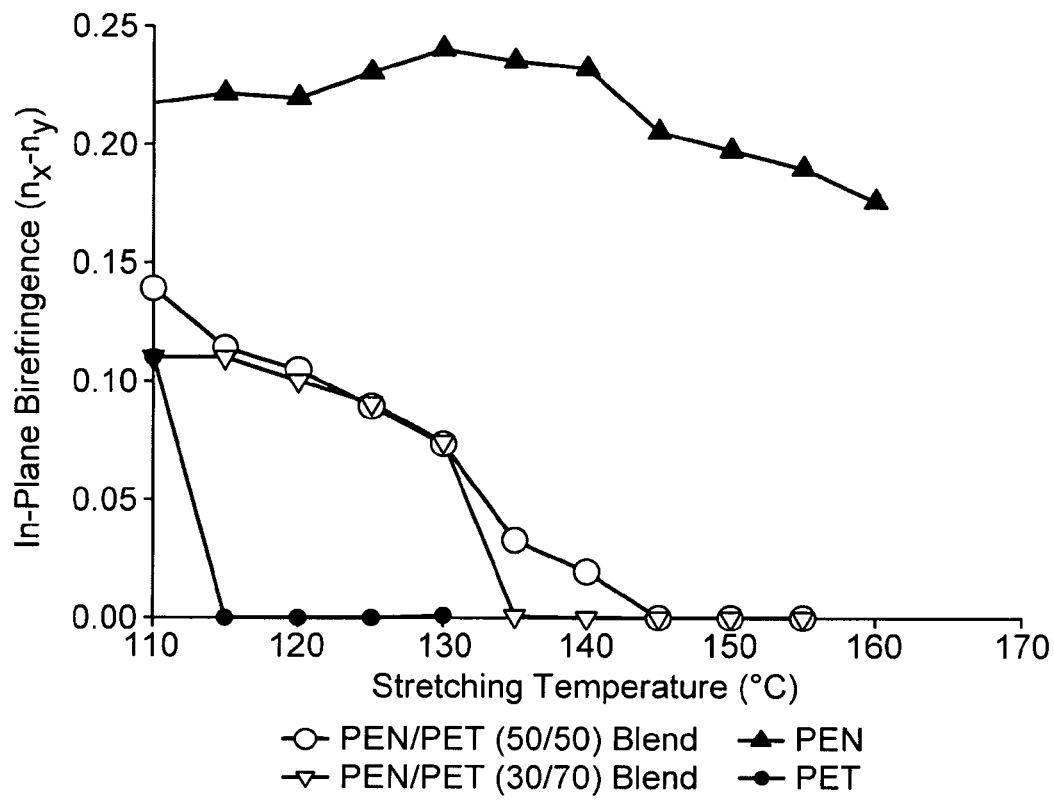
FIG. 5 is a graph illustrating the birefringence for PEN, PET and PEN/PET copolymerized blends.

FIG. 5 is a graph illustrating the birefringence data for PEN and PEN/PET blends. The birefringence of these films was calculated by ($n_x$–$n_y$) and plotted against stretching temperature in the above figure. The PEN film was able to be stretched around or slightly higher than its Tg and developed high birefringence (0.22-0.25). The birefringence gradually drops from 0.20 to 0.18, when the stretching temperature was increased from 145° C. to 160° C. For PEN/PET blends, significant birefringence (0.10-0.15) was developed at stretching temperatures of 110-120° C. However, the birefringence quickly drops to zero at 135° C. and 145° C. for 30/70 and 50/50 PEN/PET blends, respectively. At the same temperature, PEN has a birefringence of 0.18-0.20 after stretching. Therefore, it is possible to make a multilayer film such as a reflective polarizer from the combination of PEN as the first birefringent layer and a copolymerized PEN/PET blend as the second layer when this multilayer construction is stretched at least 35° C. above the Tg of PEN/PET blend.

When the birefringent polymer of the first optical layer is substantially the same as the birefringent polymer of the copolymerized blend of the second optical layer, the second thermoplastic polymer preferably comprises different carboxylate and/or glycol subunits such that the Tg of the second thermoplastic polymer is substantially lower than the birefringent polymer. Whereas the Tg of the copolymerized blend of the second optical layer is typically less than 155° C., 150° C., 145° C., 140° C., 135° C., or 130° C., the Tg of the birefringent thermoplastic polymer is typically at least 10° C., 11° C., 12° C., 13° C., 14° C., or 15° C. greater than the Tg of the copolymerized blend of the second optical layer.

The degree of randomness of the various sequences can be approximated using the theoretical approach described in U.S. Pat. No. 6,673,275; incorporated herein by reference.

TABLE 3

Block Length of PEN/PET Blends as Determined by NMR

| Polymer | Randomness % | 100mer N block | 100mer T block | infinite N block | infinite T block |
|---|---|---|---|---|---|
| 85PEN/15PET Blend | 18.5% | 25.4 | 5.6 | 30.0 | 6.6 |
| 70PEN/30PET Blend | 11.7% | 20.5 | 11.1 | 24.3 | 13.2 |
| 50PEN/50PET Blend | 14.1% | 11.2 | 14.0 | 12.8 | 16.0 |
| 30PEN/70PET Blend | 10.9% | 9.9 | 28.8 | 12.3 | 35.8 |
| 80N/20T CoPEN | 99.2% | 5.0 | 1.2 | 5.1 | 1.3 |
| 70N/30T CoPEN | 99.6% | 3.3 | 1.4 | 3.4 | 1.4 |
| 30N/70T CoPEN | 99.4% | 1.4 | 3.3 | 1.4 | 3.3 |

The actual randomness of a copolymerized blend may vary with process conditions. In general, randomness can be minimized by less melt residence time, lower melt processing temperature, and less aggressive mixing. However, it can be concluded that the % randomness of a copolymerized blend of PEN homopolymer and PET homopolymer is significantly lower than a CoPEN prepared by a typical polyester resin manufacturing process, i.e. the random condensation polymerization of the constituent monomers.

Table 3, depicts the contrast between blends of homopolymers of PEN and PET in comparison to coPEN's, i.e. random copolymers prepared from dimethyl terephthalate (T), naphthalene dicarboxylate (N), and ethylene glycol (E) monomers. With 8-10 minutes residence time, there was about 11-19% randomness in the PEN/PET blends, which results in a block length as long as 25 repeating units for 85/15 PEN/PET blend and as low as 10 repeating units for a 30/70 PEN/PET blend, based on a typical degree of polymerization of 100. Throughout the composition of 30-85% NDC, the blends have average block length longer than 6 repeating unit required to be incorporated in the PEN crystals. In contrast, coPEN resins produced through conventional polyester polymerization processes have nearly 100% randomness and their resulting length is from 1.4-5.2 at a composition of 30-70% NDC, which is much lower than the block length of PEN/PET blends with similar NDC loading.

As demonstrated in the forthcoming examples, it has been found that coPEN resins having nearly 100% randomness can exhibit poor adhesion in multilayer film constructions. On the other hand when the second layer of the multilayer film comprises a copolymerized blend comprising a birefringent polymer, the interlayer adhesion is significantly improved. Without intending to be bound by theory, it is surmised that blocks of birefringent polymer within the second layer diffuse into the adjacent birefringent layer forming a significant number of entanglements as well as co-crystallites across the interphase. The blocks of birefringent polymer that are present in the second optical layer are more likely to diffuse across the interface when these blocks contain substantially the same carboxylate and glycol subunits as the first optical layer.

In order to know approximately how long the block has to be in order to be incorporated in the birefringent high index layers, wide angle X-ray can be used to characterize the lamella thickness for strain-induced crystals. The chain folding length is about 8-11 nm which is the minimum for a co-crystallized blocks. The lamella thickness translates into a required block length of about 7-9 repeating units for effective cross-layer co-crystallization, assuming the repeating unit has a length dimension comparable to the chain-axis dimension (c) of the PEN crystal unit cell. For the reference, PET unit cell dimensions are a=4.52 Å, b=5.98 Å, c=10.77 Å, $\alpha=100°$, $\beta=118°$, $\gamma=111°$. PEN unit cell dimensions are a=6.51 Å, b=5.75 Å, c=13.2 Å, $\alpha=81°$, $\beta=114°$, $\gamma=100°$ (Polymer Handbook).

Although the 8-11 nm lamella thickness is the folded chain length in the orientation direction, the crystal grows epitaxially. By factoring in the repeating length of about 1.4 nm as calculated for PEN and PET crystal unit cells, one can estimate the minimum block length required for being incorporated into the crystals. For PEN/PET multi-block structure, a minimum of 6 is required for the block to be incorporated into the crystals.

Figure 6:
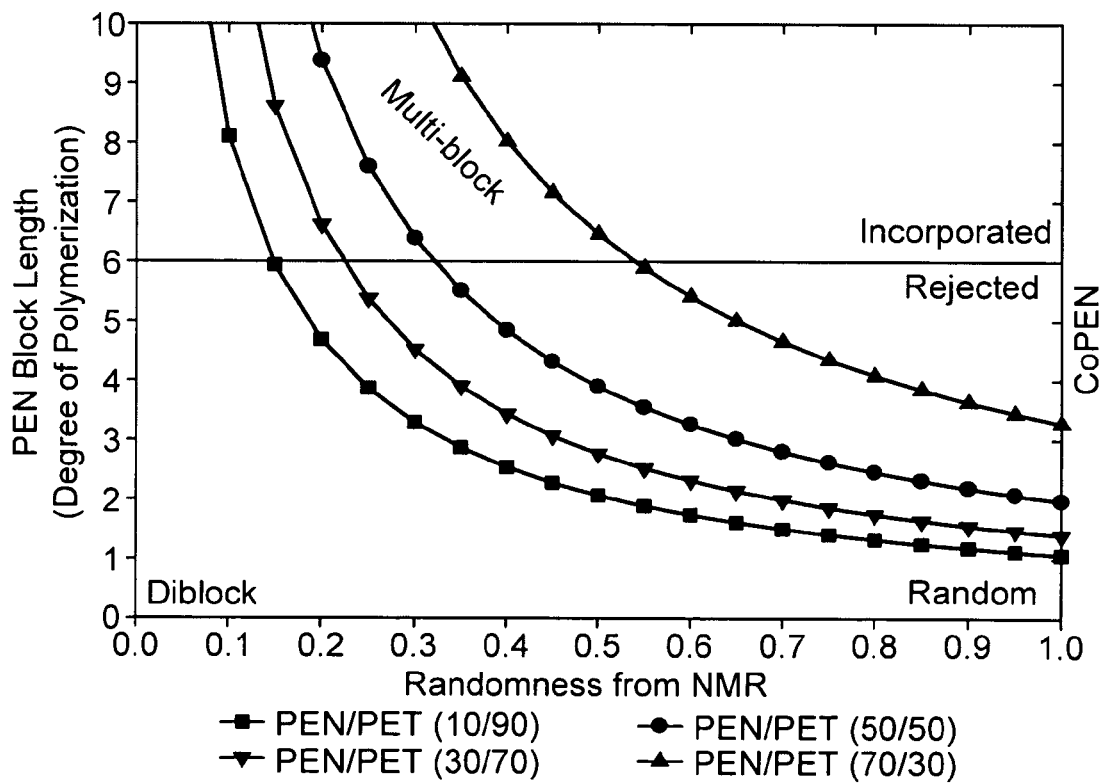
FIG. 6 is a graph illustrating the average block length of PEN/PET blends as a function of randomness.

FIG. 6 illustrate the average block length of PEN/PET blends as a function of randomness assuming an average degree of polymerization of 150 in the starting polymer. It is clear that a higher loading of PEN is desirable in order to form long enough blocks to be incorporated into the PEN crystals during strain-induced orientation. With 30% randomness, 50% of PEN is required to be blended with PET to achieve a block length of at least 6 to be effective in enhancing the interlayer adhesion. On the contrary, if one only uses 10% PEN as a component of the copolymerized blend of the second layer, the block length at 30% randomness would be about 3, which is too short for incorporation into the PEN crystals. As a result, it is expected that the short blocks will not result in physical entanglement of the chains across the interface between the first and second optical layers.

When the multilayer film comprises a copolymerized blend as described herein, the interlayer adhesion between the first and second optical layers, as measured according to the 90° Peel Test (as described in the examples) can substantially improve. In some embodiments, the interlayer adhesion is at least 300 g/in, or 400 g/inch and preferably at least 500 g/inch. Interlayer adhesion exceeding 600 g/inch, 800 g/inch and 1,000 g/inch have been obtained.

Referring again to FIG. 1, the multilayer film may optionally comprise one or more of the additional layers 18 laminated to or formed as a skin layer over at least one surface of stack 16 as illustrated in FIG. 1. Layers of the same or differing materials may be distributed within the stack, as well as on one or two of the major surfaces.

In some embodiments, the additional layers 18 typically do not significantly participate in the determination of optical properties of the multilayer polymer film 10, at least across the wavelength region of interest. The additional layers 18 may or may not be birefringent. Such additional layers may protect the optical layers from damage, aid in the co-extrusion processing, and/or to enhance post-processing mechanical properties and/or provide greater mechanical strength to the stack.

Alternatively, the appearance and/or performance of multilayer film may be altered by including additional layers such as a skin layer on a major surface or an underskin layer contiguous with a skin layer within the stack of film layers.

Typically, when the additional layers 18 are used as skin layers there will be at least some surface reflection. If the multilayer polymer film 10 is to be a polarizer, the additional layers preferably have an index of refraction which is relatively low. This decreases the amount of surface reflection. If the multilayer polymer film 10 is to be a mirror, the additional layers 18 preferably have an index of refraction which is high, to increase the reflection of light.

When the additional layers 18 are found within the stack 16, there will typically be at least some polarization or reflection of light by the additional layers 18 in combination with the optical layers 12, 14 adjacent to the additional layers 18. Typically, however, the additional layers 18 have a thickness which dictates that light reflected by the additional layers 18 within the stack 16 has a wavelength outside the region of interest, for example, in the infrared region for visible light polarizers or mirrors.

The additional layers may be prepared from polyesters such as coPEN. The additional layers may also be prepared from any of the polymeric materials previously described for use as the second low refractive index layer.

Skin layers and interior layers may be integrated at the time of film formation, either by coextrusion or in a separate coating or extrusion step, or they may be applied to the finished film at a later time, such as by coating or lamination of a skin layer to a previously formed film. Total additional layer thicknesses typically range from about 2% to about 50% of the total thickness of multilayer film.

Examples of additional layers or coatings are described in U.S. Pat. Nos. 6,368,699, and 6,459,514 both entitled "Multilayer Polymer Film with Additional Coatings or Layers," both of which are incorporated herein by reference, and U.S. Pat. No. 6,783,349 to Neavin et al., entitled "Apparatus for Making Multilayer Optical Films," incorporated herein by reference.

The composition of additional layers may be chosen, for example, to protect the integrity of layers 12, 14 during or after processing, to add mechanical or physical properties to multilayer film 10; or to add optical functionality to multilayer film 10. Functional components such as antistatic additives, ultraviolet light absorbers (UVAs), hindered amine light stabilizers (HALS), dyes, colorants, pigments, antioxidants, slip agents, low adhesion materials, conductive materials, abrasion resistant materials, optical elements, dimensional stabilizers, adhesives, tackifiers, flame retardants, phosphorescent materials, fluorescent materials, nanoparticles, anti-graffiti agents, dew-resistant agents, load bearing agents, silicate resins, light diffusing materials, light absorptive materials and optical brighteners may be included in these layers, preferably such that they do not substantially interfere with the desired optical or other properties of the resulting product. In some exemplary embodiments, one or more additional layers may be or may include diffusers, such as a rough, matte or structured surface, a beaded diffuser or a diffuser including organic and/or inorganic particles, or any number or combination thereof.

In one example, skin layers are used to aid in post-extrusion processing; for example, by preventing sticking of the film to hot rollers or tenter clips. In another embodiment, skin layers are added to impart desired barrier properties to multilayer film. For example, barrier films or coatings may be added as skin layers or as a component in skin layers to alter the transmissive properties of the multilayer film towards liquids, such as water or organic solvents, or gases, such as oxygen or carbon dioxide.

Skin layers may also be added to impart or improve abrasion resistance in the resulting multilayer film. For example, a skin layer comprising inorganic particles such as silica embedded in a polymer matrix may be used. In another embodiment, skin layers may comprise an abrasion resistant coating such as described in U.S. Pat. No. 5,677,050. Skin layers may also be added to impart or improve puncture and/or tear resistance in the resulting multilayer film. Puncture or tear resistant skin layers may be applied during the manufacturing process or later coated onto or laminated to multilayer film 10. Adhering these layers to multilayer film 10 during the manufacturing process, such as by a coextrusion process, provides the advantage that multilayer film 10 is protected during the manufacturing process.

In one example, additional layer(s) includes a dye or pigment that absorbs in one or more selected regions of the spectrum. Exemplary selected regions of the spectrum may include portions or all of the visible spectrum as well as ultraviolet and infrared. If all the visible spectrum is absorbed, the layer will appear opaque. Materials for layers can be selected in order to change the apparent color of light transmitted or reflected by multilayer film. They can also be used to compliment the properties of the film, particularly where the film transmits some frequencies while reflecting others. In another embodiment, the use of a UV absorptive material in a skin cover layer is particularly desirable because it may be used to protect inner layers that may sometimes be unstable when exposed to UV radiation. In one embodiment, a fluorescent material is incorporated into the additional layer. Fluorescent materials absorb electromagnetic energy in the ultraviolet region of the spectrum and reemit in the visible.

Adhesives, including pressure sensitive adhesives, form another desirable class of materials that may be applied to a multilayer stack as a skin layer. Generally, pressure sensitive adhesives are applied when multilayer film is intended for later lamination to another material, such as a glass or metal substrate.

Another material that may be incorporated in skin layer is a slip agent. A slip agent will make multilayer film easier to handle during the manufacturing process. Typically a slip agent is used with a mirror film rather than a film intended to transmit a portion of the light striking it. The side including the slip agent is typically the side intended to be laminated to a supporting substrate in order to prevent the slip agent from increasing haze associated with the reflection.

Many of the advantages derived from skin layers can also be derived from an analogous internal layer. Thus, the foregoing discussion regarding skin layers is also applicable to internal layer(s).

Other additional layers include layers containing holographic images, holographic diffusers, or other diffusing layers. The foregoing has described examples of various layers that can be applied to a multilayer film stack to alter its properties. In general, any additional layers may be added, typically offering different mechanical, chemical, or optical properties than those of the layers 12, 14.

In the exemplary embodiment, the additional layer may be an absorbing or dichroic polarizer layer, as described, for example, in U.S. Pat. No. 6,096,375 to Ouderkirk et al., entitled "Optical Polarizer," incorporated herein by reference. In some such configurations, the transmission axis of a dichroic polarizer is aligned with the transmission axis of a reflective polarizer.

In one embodiment, the multilayer film described herein is a reflective polarizing base layer of an optical film further comprising a microstructured surface.

As described in U.S. Pat. No. 5,183,597 (Lu) and U.S. Pat. No. 5,175,030 (Lu et al.), a microstructure-bearing article (e.g. brightness enhancing film) can be prepared by a method including the steps of (a) preparing a polymerizable composition; (b) depositing the polymerizable composition onto a master negative microstructured molding surface in an amount barely sufficient to fill the cavities of the master; (c) filling the cavities by moving a bead of the polymerizable composition between a preformed base (i.e. the multilayer film described herein) and the master, at least one of which is flexible; and (d) curing the composition. The master can be metallic, such as nickel, nickel-plated copper or brass, or can be a thermoplastic material that is stable under the polymerization conditions, and that preferably has a surface energy that allows clean removal of the polymerized material from the master. One or more the surfaces of the base film can optionally be primed or otherwise be treated to promote adhesion of the optical layer to the base.

The polymerizable resin composition typically comprises one or more ethylenically unsaturated (e.g. (meth)acrylate) monomers. The polymerizable resin composition my further comprise surface modified nanoparticles such as zirconia. Various polymerizable resin compositions are known such as described in US2006/0004166 and WO2008/121465; incorporated herein by reference.

The microstructured surface can have any of a number of useful patterns such as described and shown in U.S. Pat. No. 7,074,463. The microstructured surface can be a plurality of parallel longitudinal ridges extending along a length or width of the film. These ridges can be formed from a plurality of prism apexes. These apexes can be sharp, rounded or flattened or truncated. A useful microstructure is a regular prismatic pattern that can act as a totally internal reflecting film for use as a brightness enhancement film.

A description of the process conditions and considerations for forming multilayer polymer films is found in U.S. patent application Ser. No. 09/006,288 entitled "Process for Making Multilayer Optical Film."

The films are generally prepared by co-extruding the individual polymers to form a multilayer film and then orienting the film by stretching at a selected temperature, optionally followed by heat-setting at a selected temperature. Alternatively, the extrusion and orientation steps may be performed simultaneously. In the case of polarizers, the film is stretched substantially in one direction (uniaxial orientation), while in the case of mirror films, the film is stretched substantially in two directions (biaxial orientation), which may be performed simultaneously or sequentially.

In different processing embodiments, the multilayer film may be allowed to dimensionally relax in a cross-stretch direction, resulting in a natural reduction in cross-stretch (equal to the square root of the stretch ratio); the multilayer film may be constrained to limit any substantial change in cross-stretch dimension; or the multilayer film may be actively stretched in a cross-stretch dimension. For example, the multilayer film may be stretched in the machine direction, as with a length orienter, or in width using a tenter.

The pre-stretch temperature, stretch temperature, stretch rate, stretch ratio, heat set temperature, heat set time, heat set relaxation, and cross-stretch relaxation are selected to yield a multilayer film having the desired refractive index relationship and physical dimensions. These variables are interdependent; thus, for example, a relatively low stretch rate could be used if coupled with, for example, a relatively low stretch temperature. In general, a stretch ratio in the range from about 1:2 to about 1:10 (more preferably about 1:3 to about 1:7) in the stretch direction and from about 1:0.2 to about 1:10 (more preferably from about 1:0.5 to about 1:7) orthogonal to the stretch direction is selected in an exemplary embodiment.

Suitable multilayer films may also be prepared using techniques such as spin coating (e.g., as described in Boese et al., J. Polym. Sci.: Part B, 30:1321 (1992) for birefringent polyimides) and vacuum deposition (e.g., as described by Zang et. al., Appl. Phys. Letters, 59:823 (1991) for crystalline organic compounds); the latter technique is particularly useful for certain combinations of crystalline organic compounds and inorganic materials.

EXAMPLES

Test Methods

NMR to Determine Chemical Composition

Samples from the materials were dissolved in a 1:1 mixture of deuterated chloroform and trifluoroacetic acid. 1D NMR spectra were collected on a 500 MHz instrument equipped with a dual channel Varian Chili probe. Integrated monomer compositions are extracted based on known specific chemical shifts and the peak area. Integrations were carried out after phasing and baseline correction.

Refractive Index (RI) Measurement:

The refractive indices of the various samples were measured using a Metricon Prism coupler (Metricon Corporation, Pennington, N.J.) in the MD, TD, and TM directions. MD and TD are in-plane directions and TM is normal to the film surface. The refractive indices of MD, TD and TM are labeled as: $n_x$, $n_y$, and $n_z$, respectively.

In-Plane Birefringence, $\Delta n_{in}$:

In order to measure the birefringent nature of a uniaxially stretched film, in-plane birefringence is used.

In-plane birefringence concerns the difference of the indices ($n_x$ and $n_y$) in the orthogonal in-plane directions. More specifically for a uniaxially stretched film, in-plane birefringence refers to the difference between the stretching direction and the non-stretching direction. For example, assuming a film is uniaxially stretched in MD direction, the in-plane birefringence is expressed as following.

$$\Delta n_{in} = n_x - n_y$$

Where $n_x$ is the refractive index in the stretching direction (in this case, MD), and $n_y$ is the non-stretching direction (in this case, TD).

For a biaxially stretching film, the in-plane birefringence is relatively small and sometimes close to zero if balanced. Instead, out-of-plane birefringence is more indicative of the birefringent nature of the stretched film.

Out-of-Plane Birefringence, $\Delta n_{out}$:

In order to measure the birefringent nature of a biaxially oriented film, out-of-plane birefringence is used.

Out-of-plane birefringence concerns the difference between average of in-plane indices (MD and TD) and the index normal to the film (TM). Out-of-plane birefringence can be expressed as following:

$$\Delta n_{out} = \frac{(n_x + n_y)}{2} - n_z$$

Where $n_x$ is RI in MD and $n_y$ is RI in TD and $n_z$ is RI in TM.

Out-of-plane birefringence can also be used to measure the birefringent nature of uniaxially stretched films.

90° Peel Test Method:

The multilayer film to be tested was cut into a 25.4 mm wide strip specimen. The film strip specimen was adhered to a glass substrate (about 50 mm×150 mm) using a double sided adhesive tape with identical width (Scotch® Tape #396 from 3M Co.). The adhesive tape is dispensed directly atop the entire multilayer film strip specimen and also adhered to the center portion of the glass substrate. Also, a length of the tape strip, at the end of the tape strip which is adhered to the additional length of the substrate, was left dangling, unadhered, so it could be gripped by hand. Peel (delamination) of the film was initiated by a sharp quick pull on this free end of the tape strip, with one's thumb firmly placed 0.635 cm (¼ inch) from the leading edge of the film strip specimen, so to prevent peeling too much of the film strip specimen. The peel-initiated plaque was then loaded in a Slip/Peel Tester (Instrumentors, Inc.). The portion of the film strip specimen adhering to the tape strip was peeled away from the substrate at a 90° peel angle, at 2.54 cm/second, at 25° C. and 50% relative humidity. The error in the measured peel strength was estimated to be typically not more than 20%.

For some specimens peel could not be initiated. The adhesion between the film surface and the adhesive tape was measured to be about 590 g/cm (1500 g/in). Therefore, a test specimen which cannot be peeled was deemed to have a peel strength value in excess of 590 g/cm (1500 g/in).

Catalysts & Stabilizer

TEPA—Triethylphosphonoacetate—Rhodia (Cranbury, N.J.)

NaOAc—sodium acetate—Alfa Aesar (Ward Hill, Mass.)

Co(OAc)2—cobalt acetate—Shepherd Chemical (Cincinnati, Ohio)

Zn(OAc)2—zinc acetate—Mallinckrodt Baker (Phillipsburg, N.J.)

Sb(OAc)3—antimony triacetate—Arkema (Philadelphia, Pa.)

Monomer Abbreviation—Generic Chemical Description—Supplier (Location)

NDC—naphthalene dicarboxylic acid—BP Amoco (Naperville, Ill.)

DMT—dimethyl terephthalate—Invista (Wichita, Kans.)

EG—ethylene glycol—ME Global (Midland, Mich.)

Synthesis of Polyester Materials:

PET, 90/10 coPEN and PEN can be synthesized according to the following procedure:

For each composition, a stainless steel, oil jacketed batch reactor was charged with the amount of monomers indicated in Table 1 and the following catalysts: 2 g of Co(OAc)$_2$, 1.6 g of Zn(OAc)$_2$, 8.9 g of Sb(Oac)$_3$, and 3.6 g of triethyl phosphonoacetate (TEPA). Under pressure (239.2 kPa), the mixture was heated to 257° C. with removal of 7-8 kg of the esterification reaction by-product, methanol. After the methanol was completely removed, 3.6 g of TEPA was charged to the reactor and the pressure was then gradually reduced to below 500

Pa while heating to 277° C. The condensation reaction by-product, ethylene glycol, was continuously removed until a resin having an intrinsic viscosity of about 0.50 dL/g, as measured in 60/40 wt. % phenol/o-dichlorobenzene at 30° C., was produced.

TABLE 4

Monomer Concentrations Employed in the Synthesis of the Copolyesters

| Polymer | NDC lb | DMT lb | EG lb |
|---|---|---|---|
| PEN | 39.4 | 0 | 23 |
| PET | 0.0 | 37.9 | 25.8 |

Procedure for the Production of the Multilayer Films:

Coextruded films containing 3 layers were made on a pilot extrusion line using a 3-layer ABA (skin/core/skin) feedblock. The Layer-A polymer was polypropylene commercially available from Exxon under the grade name of Escorene PP1024, and was fed by a single screw extruder to the skin channel of the feedblock. The Layer-B polymer was birefringent copolyester of each example, and was fed by a twin screw extruder to the core channel of the feedblock. The feed ratio for skin/core/skin was 1:1:1 by volume. The total extrusion rate was 30 lbs per hour. The extrudate was cast with a film die onto a chill roll to make cast web. Specimens of the cast web were then subjected to constrained uniaxial stretching in a KARO IV batch stretching machine (Bruckner Maschinengebau, Siegsdorff, Germany) at a temperature of 145° C., a draw ratio of 1×4.5, a draw rate of 100%/second, and a preheat time of 60 seconds. In order to evaluate the birefringence of the copolyesters, the polypropylene skin layers are peeled off after stretching to expose the core birefringent layer. The refractive indices for the core layer are measured using a Metricon Prism coupler (Metricon Corporation, Pennington, N.J.) in the MD, TD, and TM directions. In-plane and out-of-plane birefringence were calculated based on the equations outlined in the testing methods section.

TABLE 5

Hot-Stretched PEN vs Isotropic PEN/PET Blends

|  | $n_x$ (MD) | $n_y$ (TD) | $n_z$ (TM) | $n_x - n_y$ | $n_y - n_z$ |
|---|---|---|---|---|---|
| Birefringent Optical Layer PEN Homopolymer | 1.830 | 1.620 | 1.500 | 0.210 | 0.120 |
| Isotropic Optical Layer Example 1 - 70/30 PEN/PET Blend | 1.6247 | 1.6192 | 1.6169 | 0.0055 | 0.0023 |
| Isotropic Optical Layer Example 2 50/50 PEN/PET Blend | 1.6077 | 1.6073 | 1.6063 | 0.0004 | 0.0010 |

Comparative Example 1

PEN:CoPEN5545, 246 Layers, Polarizers

A multilayer optical film containing 246 layers was made by extruding the cast web in one operation and later orienting the film in a film-stretching apparatus. A birefringent polymer, polyethylene naphthalate (PEN), with an Intrinsic Viscosity of 0.48 dl/g (60 wt. % phenol/40 wt. % dichlorobenzene) was delivered by one extruder at a rate of 20 pounds per hour to the feedblock and a second material, a CoPEN5545, was delivered by a second extruder at a rate of 30 pounds per hour to the feedblock. PEN was used as the skin material on a third extruder at a rate of 15 pounds per hour. A feedblock and two layer multipliers were used to generate 246 layers. The cast web was 21 mils thick and 6 inches wide. The cast web was later uniaxially stretched in a batch orienter at about 150° C. in the transverse direction at a uniform rate of about 100%/sec while it is constrained in the other in-plane direction. The stretch ratio was about 5.0 to 1. The resulting multilayer film has good light polarizing effect but its interlayer adhesion is measured to be less than 100 g/in (Table 6).

Example 1

PEN:(PEN/PET 60:40), 246 Layers, Polarizers

A multilayer optical film containing 246 layers was made by extruding the cast web in one operation and later orienting the film in a film-stretching apparatus. A birefringent polymer, polyethylene naphthalate (PEN), with an Intrinsic Viscosity of 0.48 dl/g (60 wt. % phenol/40 wt. % dichlorobenzene) was delivered by one extruder at a rate of 20 pounds per hour to a feedblock and a second material was delivered by a second extruder at a rate of 30 pounds per hour to the feedblock. The second material was a blend of two birefringent polymers, PEN and PET, at a weight ratio of 60:40. PEN was used as the skin material on a third extruder at a rate of 15 pounds per hour. A feedblock and two layer multipliers were used to generate 246 layers. The cast web was 21 mils thick and 6 inches wide. The cast web was later uniaxially stretched in a batch orienter at about 150° C. in the transverse direction at a uniform rate of about 100%/sec while it is constrained in the other in-plane direction. The stretch ratio was about 5.0 to 1. The resulting multilayer film has good light polarizing effect and has excellent interlayer adhesion that is measured to be higher than 1500 g/in (Table 6).

Example 2

PEN:(PEN/PET 50:50), 246 Layers, Polarizers

A multilayer optical film containing 246 layers was made by extruding the cast web in one operation and later orienting the film in a film-stretching apparatus. A birefringent polymer, polyethylene naphthalate (PEN), with an Intrinsic Viscosity of 0.48 dl/g (60 wt. % phenol/40 wt. % dichlorobenzene) was delivered by one extruder at a rate of 20 pounds per hour to a feedblock and a second material was delivered by a second extruder at a rate of 30 pounds per hour to the feedblock. The second material was a blend of two birefringent polymers, PEN and PET, at a weight ratio of 50:50. PEN was used as the skin material on a third extruder at a rate of 15 pounds per hour. A feedblock and two layer multipliers were used to generate 246 layers. The cast web was 21 mils thick and 6 inches wide. The cast web was later uniaxially stretched in a batch orienter at about 150° C. in the transverse direction at a uniform rate of about 100%/sec while it is constrained in the other in-plane direction. The stretch ratio was about 5.0 to 1. The resulting multilayer film has good light polarizing effect and has excellent interlayer adhesion that is measured to be higher than 1500 g/in (Table 6).

TABLE 6

Interlayer adhesion of multilayer optical films

| Ex | # of Layers | Skin | Layer #1 HIO | Layer #2 LIO | HIO/LIO ratio | 90° Peel Test g/in |
|----|----|----|----|----|----|----|
| C1 | 246 | PEN | PEN | CoPEN5545 | 1:1 | <100 |
| 1 | 246 | PEN | PEN | PEN/PET Blend (60/40) | 1:1 | >1500 |
| 2 | 246 | PEN | PEN | PEN/PET Blend (50/50) | 1:1 | >1500 |

What is claimed is:

1. A multilayer optical film comprising
   a) at least one first optical layer consisting of a birefringent polyethylene naphthalate thermoplastic polymer, comprising at least 95 mol % of naphthalate subunits, based on a 100 mol % carboxylate subunits and greater than 95% of ethylene glycol subunits, based on 100% glycol subunits, the first optical layer having an in-plane birefringence of at least 0.15 at 632.8 nm; and
   b) at least one second optical layer having an in-plane birefringence of less than 0.040 at 632.8 nm; wherein the second optical layer consists of a copolymerized blend consisting of 40 to 60 mol % of the birefringent polyethylene naphthalate thermoplastic polymer of the first layer and a polyethylene terephthalate thermoplastic polymer comprising at least 95 mol % of terephthalate subunits, based on a 100 mol % carboxylate subunits and greater than 95% of ethylene glycol subunits, based on 100% glycol subunits.

2. The multilayer optical film of claim 1 wherein the birefringent polyethylene naphthalate thermoplastic polymer of the first optical layer has a Tg at least 10° C. greater than the copolymerized blend of the second layer.

3. The multilayer optical film of claim 1 wherein the copolymerized blend of the second optical layer has a % randomness of less than 50%.

4. The multilayer optical film of claim 1 wherein the copolymerized blend of the second optical layer has a % randomness of less than 25%.

5. The multilayer optical film of claim 1 wherein the copolymerized blend comprises A-B multi-block copolymer structures wherein the A blocks consist of the birefringent polyethylene naphthalate thermoplastic polymer of the first layer and the B blocks consist of the second polyethylene terephthalate thermoplastic polymer.

6. The multilayer optical film of claim 5 wherein the A-B multi-block copolymer structures have an average block length of at least 6.

7. The multilayer optical film of claim 5 wherein the A-B multi-block copolymer structures have an average block length of no greater than 25.

8. The multilayer film of claim 1 wherein the second polyethylene terephthalate thermoplastic polymer of the copolymerized blend has a Tg at least 15° C. less than the birefringent polyethylene naphthalate thermoplastic polymer of the first optical layer.

9. The multilayer optical film of claim 1 wherein the multilayer optical film is a reflective polarizer.

10. The multilayer optical film of claim 1 wherein the multilayer optical film is a mirror.

11. An optical film comprising
   a base layer comprising the multilayer film of claim 1; and
   a microstructured surface layer disposed on the base layer.

12. The optical film of claim 11 wherein the microstructured surface comprises the reaction product of a polymerizable resin composition.

13. The optical film of claim 11 wherein the polymerizable resin composition further comprises surface modified zirconia nanoparticles.

14. The multilayer optical film of claim 1 wherein the copolymerized blend has a Tg less than 155° C.

15. The multilayer film of claim 1 wherein the multilayer film exhibits an interlayer adhesion of at least 500 g/inch.

16. A multilayer optical film comprising
   a) at least one first optical layer consisting of a birefringent polyethylene naphthalate thermoplastic polymer, comprising at least 95 mol % of naphthalate subunits, based on a 100 mol % carboxylate subunits and greater than 95% of ethylene glycol subunits, based on 100% glycol subunits, the first optical layer having an in-plane birefringence of at least 0.15 at 632.8 nm; and
   (b) at least one second optical layer having an in-plane birefringence of less than 0.040 at 632.8 nm; wherein the second optical layer consists of a copolymerized blend consisting of the birefringent polyethylene naphthalate thermoplastic polymer of the first layer and polyethylene terephthalate thermoplastic polymer comprising at least 95 mol % of terephthalate subunits, based on a 100 mol % carboxylate subunits and greater than 95% of ethylene glycol subunits, based on 100% glycol subunits, wherein the weight ratio of polyethylene naphthalate thermoplastic polymer to polyethylene terephthalate thermoplastic polymer ranges from 60/40 to 50/50.

17. A method of making a multilayer optical film comprising
   a) extruding at least one first optical layer consisting of a birefringent polyethylene naphthalate thermoplastic polymer, comprising at least 95 mol % of naphthalate subunits, based on a 100 mol % carboxylate subunits and greater than 95% of ethylene glycol subunits, based on 100% glycol subunits; and
   (b) extruding at least one second optical layer, wherein the second optical layer consists of a copolymerized blend consisting of the birefringent polyethylene naphthalate thermoplastic polymer of the first layer and polyethylene terephthalate thermoplastic polymer comprising at least 95 mol % of terephthalate subunits, based on a 100 mol % carboxylate subunits and greater than 95% of ethylene glycol subunits, based on 100% glycol subunits, wherein the weight ratio of polyethylene naphthalate thermoplastic polymer to polyethylene terephthalate thermoplastic polymer ranges from 60/40 to 50/50;
   c) orienting the film such that the first optical layer has an in-plane birefringence of at least 0.15 at 632.8 nm and the second optical layer has an in-plane birefringence of less than 0.040 at 632.8 nm.

18. The method of making a multilayer optical film of claim 17 wherein the film was oriented at a temperature up to 30° C. above the Tg of the birefringent polyethylene naphthalate thermoplastic polymer of the first optical layer and at least 35° C. above the Tg of the copolymerized blend of the second optical layer.

* * * * *

UNITED STATES PATENT AND TRADEMARK OFFICE
CERTIFICATE OF CORRECTION

PATENT NO.        : 9,046,656 B2
APPLICATION NO.   : 12/273006
DATED             : June 2, 2015
INVENTOR(S)       : Richard Liu It is certified that error appears in the above-identified patent and that said Letters Patent is hereby corrected as shown below:

Specification

Column 6
Line 37-38, Delete "transesterfication)" and insert -- transesterification) --, therefor.

Column 7
Line 49, Delete "transesterfication)" and insert -- transesterification) --, therefor.

Column 17
Line 31, Delete "Maschinengebau," and insert -- Maschinenbau, --, therefor.
Line 31, Delete "Siegsdorff," and insert -- Siegsdorf, --, therefor.

Claims

Column 19
Line 55, In Claim 8, delete "film" and insert -- optical film --, therefor.

Column 20
Line 12, In Claim 15, delete "film" and insert -- optical film --, therefor.

Signed and Sealed this
Twenty-second Day of March, 2016

Michelle K. Lee
*Director of the United States Patent and Trademark Office*